United States Patent Office 3,482,144
Patented Dec. 2, 1969

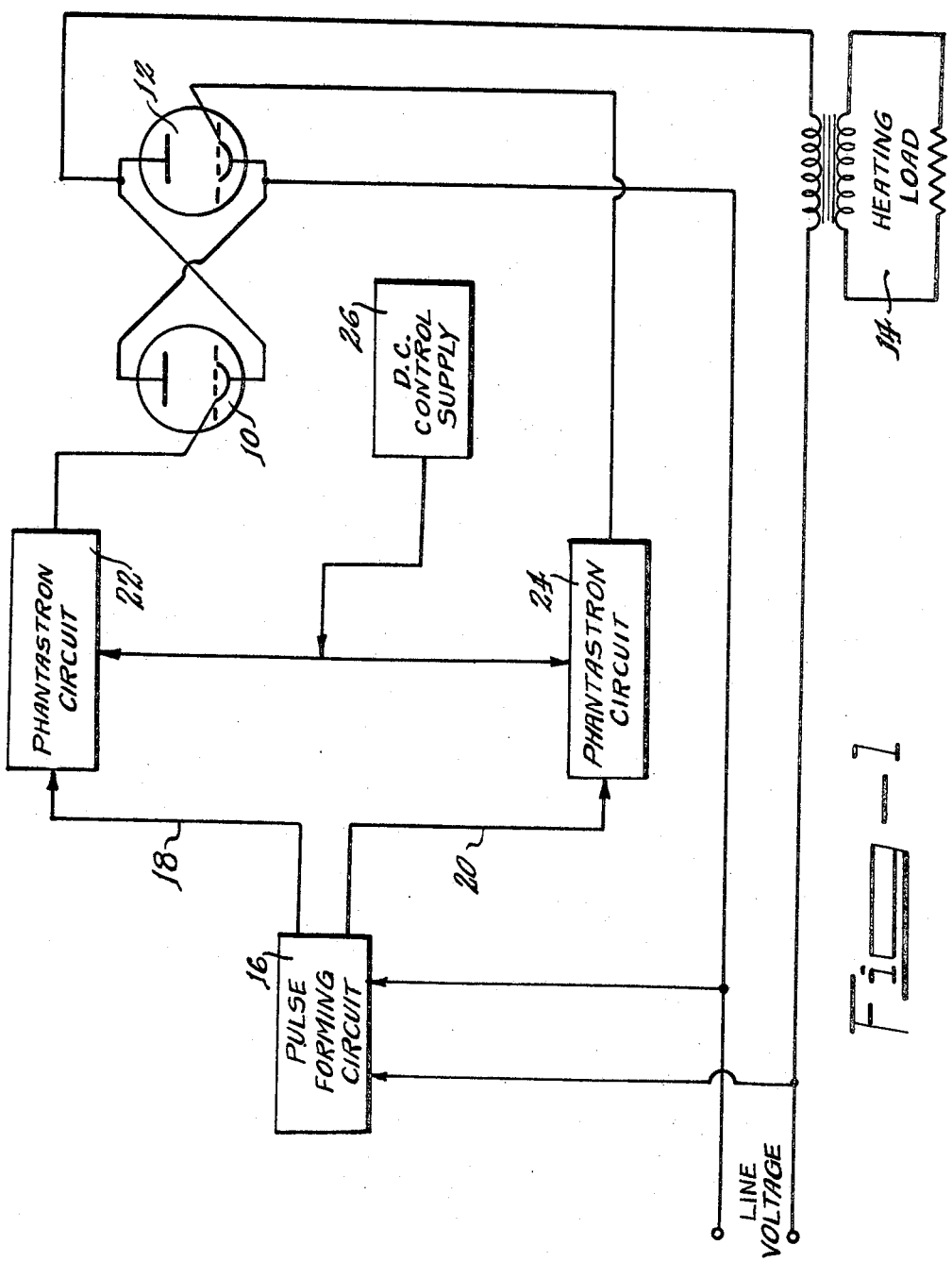

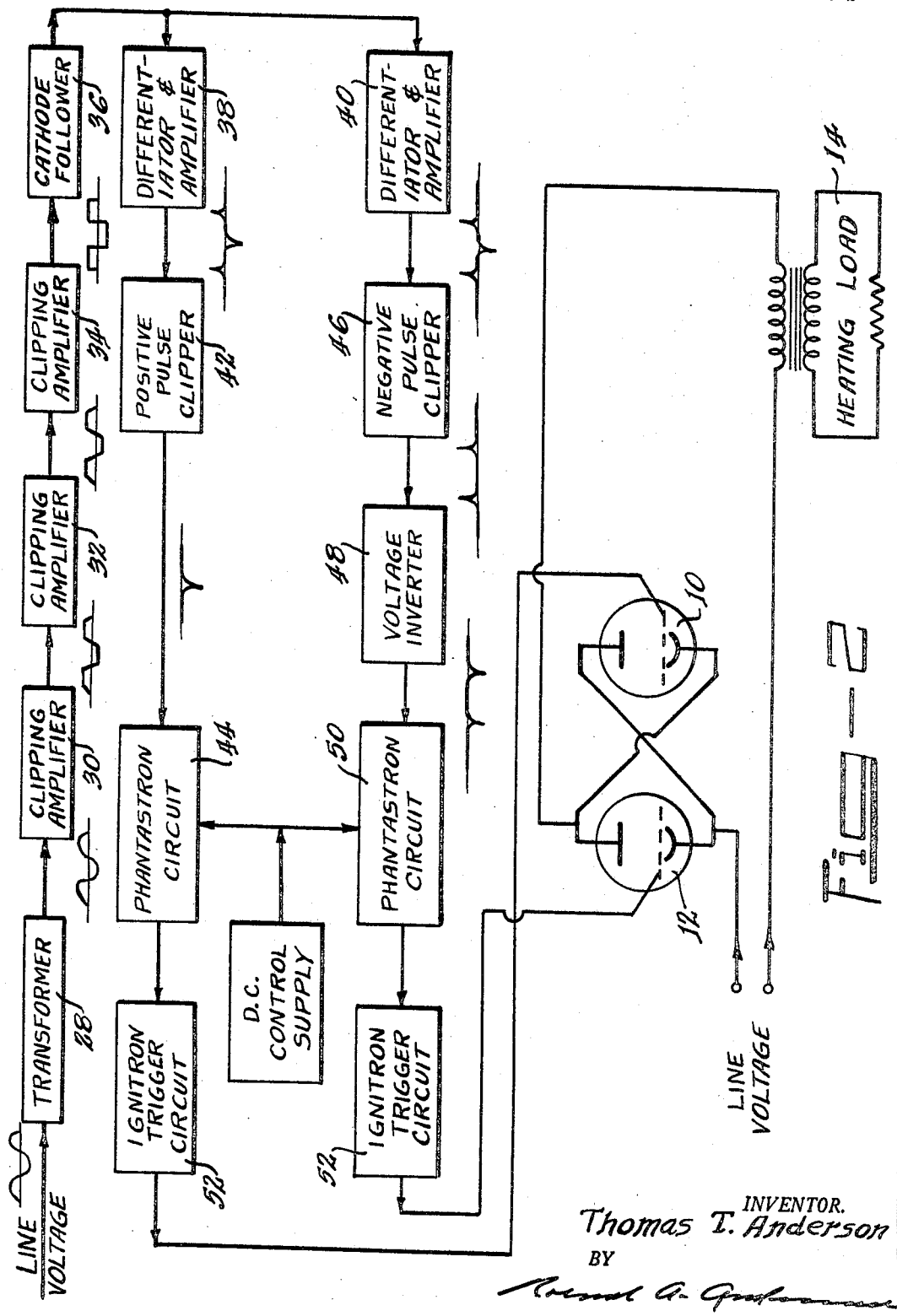

3,482,144
PHANTASTRON DRIVE FOR IGNITRONS
Thomas T. Anderson, Downers Grove, Ill., assignor to the United States of America as represented by the United States Atomic Energy Commission
Filed May 12, 1967, Ser. No. 639,255
Int. Cl. H05b 41/36, 39/08
U.S. Cl. 315—196                                    4 Claims

ABSTRACT OF THE DISCLOSURE

An apparatus for controlling the firing time of an ignitron having an A-C supply where a pulse-forming circuit generates pulses synchronized with the A-C supply. A phantastron circuit driven by these pulses provides pulses precisely regulated in time to control the time of firing of the ignitron.

CONTRACTUAL ORIGIN OF THE INVENTION

The invention described herein was made in the course of, or under, a contract with the United States Atomic Energy Commission.

BACKGROUND OF THE INVENTION

This invention relates to ignitron contactors and more specifically to means for controlling the firing time of ignitron contactors.

Ignitron contactors are generally used as switching elements in resistance welding and also in heat-control circuits. In making short-duration welds, it is requisite that the ignitrons be actuated at a precise time. Conventionally the ignitron is actuated by a thyratron which, in turn, is fired using a phase shift circuit. This means of controlling the firing time of an ignitron contactor is accurate within 1 or 2% of 180 degrees, which is insufficient for some applications.

Accordingly, it is an object of the present invention to provide an improved means for controlling the firing time of an ignitron contactor.

It is another object of the present invention to provide means which are capable of controlling the firing time of an ignitron contactor within ±.2% of 180 degrees.

Further objects of the present invention will become more apparent as the detailed description proceeds.

SUMMARY OF THE INVENTION

In general, for an ignitron contactor having an A-C supply, the present invention comprises means for generating pulses synchronized with said A-C supply. Means are provided for applying said pulses to the input of a phantastron circuit to produce therefrom an output pulse precisely delayed in time. Means are also provided for applying the precisely delayed output pulses of the phantastron circuit to the ignitor of the ignitron whereby the ignitron is caused to fire responsive thereto.

BRIEF DESCRIPTION OF THE DRAWINGS

Further understanding of the present invention may best be obtained from consideration of the accompanying drawings wherein:

FIG. 1 is a block diagram of a general embodiment of an apparatus constructed according to the teachings of the present invention.

FIG. 2 is a detailed block diagram of the preferred embodiment constructed according to the practice of the present invention.

In FIG. 1, normal line voltage is applied across a pair of inverse parallel connected ignitron contactors 10 and 12 which are used to provide power to a heating load 14. The line voltage is also fed to a pulse-forming circuit 16.

Pulse-forming circuit 16 operates to produce an output pulse responsive to each half cycle of the applied line voltage. The pulse-forming circuit also separates the outputs into two channels, channel 18 for output pulses generated responsive to the positive half cycles of applied line voltage and channel 20 for output pulses generated responsive to the negative half cycles of applied line voltage.

The outputs 18 and 20 from pulse-forming circuit 16 are fed to the inputs of phantastron circuits 22 and 24, respectively. A D-C control supply 26 furnishes the control voltage bias for each of the phantastron circuits 22 and 24. The phantastron circuits 22 and 24 are of conventional design of the type described in National Bureau of Standards circuit design number 57 and employ Miller integrators to provide a linearly increasing voltage. This increasing voltage is initiated for each of the phantastron circuits 22 and 24 by the input pulses from the outputs 18 and 20, respectively, of pulse-forming circuit 16. When the increasing voltage for each of the phantastron circuits 22 and 24 reaches the level set by the D-C voltage from the D-C control supply 26, the associated phantastron circuit triggers back to its quiescent state to produce therefrom a precisely delayed output pulse. Thus, the output from each phantastron circuit 22 and 24 is an output pulse which is delayed in time a precise predetermined amount with respect to the input trigger pulse, the amount of time delay being determind by the amplitude of the control voltage applied to the phantastron circuits 22 and 24 from the D-C control supply 26.

The precisely timed output from each phantastron circuit 22 and 24 is fed to the ignitor of the associated ignitrons 10 or 12 to control the time of firing thereof. With the control apparatus as described, the ignitrons 10 and 12 may be fired within an accuracy of ±.2% of 180 degrees.

DESCRIPTION OF THE PREFERRED EMBODIMENT

In FIG. 2, the preferred embodiment of the present invention is shown for the control of the firing time of two inverse parallel connected ignitrons 10 and 12 which are used to provide power to a heating load 14. The line voltage used to drive the ignitrons 10 and 12 is also fed to a coupling transformer 28. The output of the coupling transformer is fed through a series of three clipping amplifiers 30, 32 and 34 to a cathode follower 36. The clipping amplifiers 30, 32 and 34 operate conventionally to shape the sine wave of the line voltage to a square wave. The output of clipping amplifier 34 (a square wave) is coupled via the cathode follower 36 to two differentiator-amplifier circuits 38 and 40. Differentiator-amplifier circuits 38 and 40 operate to differentiate the square wave output of clipping amplifier 34 and to provide amplification thereof.

The output from differentiator-amplifier circuit 38 is fed to the input of a pulse-clipping circuit 42 which operates to clip the positive differentiated pulses and gives an output of only negative pulses. The negative pulse output from pulse-clipping circuit 42 is fed to the input of a phantastron circuit 44 of the type described in FIG. 1.

The output from differentiator-amplifier 40 is fed to a pulse-clipping circuit 46 which operates to clip negative pulses from the output of differentiator 40 and provide an output comprising only positive pulses. A voltage inverter circuit 48 inverts the positive pulses from pulse-clipping circuit 46 to provide an output therefrom of negative pulses. The output from voltage inverter 48 is fed to the input of a phantastron circuit 50 of the type described in FIG. 1.

In some instances, the outputs from each of the phantastron circuits 44 and 50 do not have sufficient power to drive and control the ignitron contactors 10 and 12. In this situation, an ignitron trigger circuit 52 is inserted between the associated phantastron and ignitron. The ignitron trigger circuit 52 amplifies the power of each output pulse from the associated phantastron circuit 44 or 50 so that adequate control of the ignitron 10 or 12 may be effected.

It is to be noted that the aforedescribed control circuit has been utilized to control and A-C type heating load 14 wherein two ignitrons 10 and 12 are used in an inverse parallel connection. It is to be understood that the present invention is not to be limited thereto but may be used to control the firing time of a single ignitron as is found in controlling a resistive load. In such a situation, only a single differentiator circuit 38, pulse clipper circuit 42 and phantastron circuit 44 need be employed following the pulse-forming circuit.

It is to be further noted that the present invention is not to be limited to the signal polarities aforedescribed but that other polarities may be substituted therefor.

Persons skilled in the art will, of course, readily adapt the general teachings of the invention to embodiments far different from the embodiments illustrated. Accordingly, the scope of the protection afforded the invention should not be limited to the particular embodiment illustrated in the drawings and described above, but should be determined only in accordance with the appended claims.

The embodiments of the invention in which an exclusive property or privilege is claimed are defined as follows:

1. A device for controlling the firing time of an ignitron including an A-C supply comprising means for generating pulses synchronized with the A-C supply of said ignitron and including clipping amplifier means, means for applying said ignitron A-C supply to said clipping amplifier means, differentiating means, means for applying the output of said clipping amplifier means to said differentiating means, and clipping means connected to said differentiating means to provide output pulses of like polarity; a phantastron circuit; variable D-C supply means connected to said phantastron circuit to provide a variable control voltage bias therefor; means for applying said generated pulses to the input of said phantastron circuit; and means for connecting the output of said phantastron to said ignitron to initiate firing thereof responsive to said phantastron output.

2. In an apparatus including a pair of inverse parallel connected ignitrons and an A-C power supply connected thereto, the combination with means for generating a first pulse train synchronized with said A-C power supply, means for generating a second pulse train synchronized with said A-C power supply, first and second phantastron circuits, means for generating and applying a D-C control voltage vias to each of said phantastron circuits, means for applying each of said pulse trains to an associated one of said phantastron circuits, and means for applying the output of each of said phantastron circuits to an associated one of said ignitrons to control the firing time thereof.

3. The device according to claim 2 wherein said first and second pulse-train-generating means comprise means for generating a square wave signal synchronized with said A-C supply, means responsive to the positive polarity half cycles of said square wave signal for generating therefrom a first pulse train of predetermined polarity, and means responsive to the negative polarity half cycles of said square wave signal for generating therefrom a second pulse train of like polarity as said first pulse train.

4. The device according to claim 3 wherein said first and second pulse-train-generating means comprise signal-clipping means, means for applying said A-C supply to said clipping means, first and second differentiating means, means for applying the output of said clipping means to each of said first and second differentiating means wherefrom differentiated output pulses are generated, first means for clipping from the output of said differentiating means pulses of predetermined like polarity to provide a first train of like polarity pulses, second means for clipping from the output of said second integrating means pulses of like polarity as said first pulse train, and means for inverting the polarity of the output pulses of said second clipping means to provide a second train of pulses of like polarity as said first train.

References Cited
UNITED STATES PATENTS

| | | | |
|---|---|---|---|
| 2,367,940 | 1/1945 | Gulliksen | 250—27 |
| 2,491,975 | 12/1949 | Hartwig | 315—246 |
| 2,748,317 | 5/1956 | Van De Wiel | 315—144 |
| 3,143,698 | 8/1964 | Rockafellow | 323—18 |
| 3,229,161 | 1/1966 | Anger | 315—196 |

JOHN W. HUCKERT, Primary Examiner

S. BRODER, Assistant Examiner

U.S. Cl. X.R.

315—251, 261, 264